US006692209B1

(12) United States Patent
Pruet et al.

(10) Patent No.: US 6,692,209 B1
(45) Date of Patent: Feb. 17, 2004

(54) METHOD AND SYSTEM FOR MANUFACTURING A PHOTOCATHODE

(75) Inventors: James D. Pruet, Garland, TX (US); David G. Couch, Kaufman, TX (US)

(73) Assignee: Litton Systems, Inc., Woodland Hills, CA (US)

( * ) Notice: Subject to any disclaimer, the term of this patent is extended or adjusted under 35 U.S.C. 154(b) by 0 days.

(21) Appl. No.: 09/443,180

(22) Filed: Nov. 19, 1999

(51) Int. Cl.[7] .................................................. B65G 49/07
(52) U.S. Cl. ........................................ 414/217; 414/939
(58) Field of Search ................................ 414/217, 939; 118/719, 50, 500, 50.1, 56, 728, 730, 729; 269/55, 58, 56, 909

(56) References Cited

U.S. PATENT DOCUMENTS 3,912,829 A * 10/1975 Takahashi et al. ............ 427/78
4,278,380 A * 7/1981 Guarino ....................... 414/217
4,412,812 A * 11/1983 Sadowski et al. ........... 432/121
4,421,786 A * 12/1983 Mahajan et al. ........ 118/728 X
4,745,088 A * 5/1988 Inoue et al. ............ 118/730 X
4,781,511 A * 11/1988 Harada et al. ........... 414/217.1
4,979,464 A * 12/1990 Kunze-Concewitz et al. .... 118/719
4,999,211 A * 3/1991 Duggan ............... 118/668 XV
5,069,269 A * 12/1991 Reuter et al. ........... 414/672 X
5,306,370 A * 4/1994 Herko et al. ................ 156/155
5,311,103 A * 5/1994 Asmussen et al. ...... 315/111.81
5,443,648 A * 8/1995 Ohkase ........................ 118/724
5,850,071 A * 12/1998 Makiguchi et al. ..... 118/728 X
6,062,853 A * 5/2000 Shimazu et al. ............ 432/258
6,152,288 A * 11/2000 Woltjer et al. ... 198/867.01 XV

FOREIGN PATENT DOCUMENTS

JP 64725 * 1/1989
JP 1268870 * 10/1989
JP 456766 * 2/1992

* cited by examiner

*Primary Examiner*—Steven A. Bratlie
(74) *Attorney, Agent, or Firm*—Baker Botts, L.L.P.

(57) ABSTRACT

A system (10) for manufacturing a photocathode includes a housing (12) having a first end and a second end. The first end of the housing (12) is operable to be coupled to a vacuum chamber (22). The system (10) also includes a drive support (20) disposed within the housing (12). The system (10) includes a shaft (14) disposed within the housing (12) and a ladder (16) coupled to the shaft (14). The ladder (16) includes at least one rung (140) to retain the photocathode. The system (10) further includes a drive system (18) supported by the drive support (20) within the housing (12). The drive system (18) is coupled to the shaft (14) and is operable to translate the shaft (14) relative to the housing (12) to position the rung (140) of the ladder (16) at a predetermined location within the vacuum chamber (22).

16 Claims, 7 Drawing Sheets

METHOD AND SYSTEM FOR MANUFACTURING A PHOTOCATHODE

TECHNICAL FIELD OF THE INVENTION

This invention relates in general to the field of electro-optics and, more particularly, to a method and system for manufacturing a photocathode.

BACKGROUND OF THE INVENTION

There are numerous methods and systems for detecting radiation. In one type of detector, photocathodes are used in conjunction with microchannel plates (MCPs) to detect low levels of electromagnetic radiation. Photocathodes emit electrons in response to exposure to photons. The electrons may then be accelerated by electrostatic fields toward a microchannel plate. A microchannel plate is typically manufactured from lead glass and has a multitude of channels, each one operable to produce cascades of secondary electrons in response to incident electrons. A receiving device then receives the secondary electrons and sends out a signal responsive to the electrons. Since the number of electrons emitted from the microchannel plate is much larger than the number of incident electrons, the signal produced by the device is stronger than it would have been without the microchannel plate.

One example of the use of a photocathode with a microchannel plate is an image intensifier tube. The image intensifier tube is used in night vision devices to amplify low light levels so that the user can see even in very dark conditions. In the image intensifier tube, a photocathode produces electrons in response to photons from an image. The electrons are then accelerated to the microchannel plate, which produces secondary emission electrons in response. The secondary emission electrons are received at a phosphor screen or, alternatively, a charge coupled device (CCD), thus producing a representation of the original image.

Another example of a device that uses a photocathode with a microchannel plate is a scintillation counter used to detect particles. High-energy particles pass through a scintillating material, thereby generating photons. Depending on the type of material used and the energy of the particles, these photons can be small in number. A photocathode in conjunction with a microchannel plate can be used to amplify the photon signal in similar fashion to an image intensifier tube. The detector can thus be used to detect faint particle signals and to transmit a signal to a device, e.g., a counter, that records the particle's presence.

A photocathode may undergo various material processing operations to provide anti-reflection properties, filtering properties, electron transportability properties, and other suitable properties associated with the photocathode. Additionally, a variety of material processing operations may require placing the photocathode into a vacuum chamber and performing the material processing operation under vacuum pressures.

Various types of systems may be used to load the photocathode into the vacuum chamber so that the material processing operation may be performed under vacuum pressures. An example vertical loading system may include a housing and a drive shaft disposed within the housing. The drive shaft may have linearly formed teeth for engaging corresponding teeth of a gear such that rotation of the gear causes movement of the drive shaft relative to the housing. A rotary drive mechanism may be coupled to the gear to provide rotation of the gear, and the rotary drive mechanism may be coupled to the housing such that the gear extends through an opening in the housing to provide engagement of the teeth of the gear with the teeth of the drive shaft. A ladder for retaining one or more photocathodes may be coupled to the drive shaft such that movement of the drive shaft causes movement of the ladder to various positions within the vacuum chamber.

In operation, the photocathodes are positioned on the ladder and a door or other opening providing access to the ladder is closed. A vacuum is then applied to the housing until a vacuum pressure within the housing is substantially equal to a vacuum pressure in the vacuum chamber. Once the vacuum pressures are substantially equal, a gate valve to a processing portion of the vacuum chamber may be opened and the ladder may be lowered into the processing portion of the vacuum chamber by activating the rotary drive mechanism.

Prior systems and methods for manufacturing a photocathode suffer several disadvantages. For example, the components of the housing of the vertical loading system are generally welded together to ensure that the completed housing is operable to maintain vacuum pressures. As a result of the welding processes, angular variations between the various components of the housing may cause a misalignment of the gear extending through the opening in the housing with the drive shaft. The gear-to-drive shaft misalignment may cause improper engagement of the corresponding teeth of the gear and drive shaft, thereby resulting in premature wear and/or damage to the teeth. For example, improper engagement of the teeth may cause cracking and/or chipping of the teeth. The debris from the damaged teeth may then fall downwardly and onto the photocathodes, thereby interfering with the material processing operations performed on the photocathodes. Additionally, downwardly directed forces resulting from the weight of the drive shaft may cause a deflection of the gear relative to the drive shaft, thereby resulting in a misalignment of the gear relative to the drive shaft.

SUMMARY OF THE INVENTION

Accordingly, a need has arisen for a better technique having greater flexibility and adaptability for manufacturing a photocathode. In accordance with the present invention, a system and method for manufacturing a photocathode is provided that substantially eliminates or reduces disadvantages and problems associated with previously developed systems and methods.

According to one embodiment of the present invention, a system for manufacturing a photocathode includes a housing having a first end and a second end. The first end of the housing is operable to be coupled to a vacuum chamber. The system also includes a drive support disposed within the first housing. The system includes a shaft disposed within the first housing and a ladder coupled to the shaft. The ladder includes at least one rung to retain the photocathode. The system further includes a drive system supported by the drive support within the housing. The drive system is coupled to the shaft and is operable to translate the shaft relative to the housing to position the rung of the ladder at a predetermined location within the vacuum chamber.

According to another embodiment of the present invention, a method for manufacturing a photocathode includes positioning the photocathode on a rung of a ladder. The ladder is coupled to a shaft, and the shaft is disposed within a housing. The housing is coupled to a vacuum chamber. The method also includes activating a drive system coupled to the shaft to translate the shaft relative to the housing to position the rung at a predetermined location within the vacuum chamber. The drive system is supported by a drive support disposed within the housing. The method further includes activating the drive system to translate the shaft relative to the housing to remove the rung from the predetermined location within the vacuum chamber after removal of the photocathode from the rung.

The technical advantages of the present invention include providing a system and method for manufacturing a photocathode that provides greater flexibility and reliability than prior systems. For example, according to one aspect of the present invention, a drive system extends through an opening in a housing to engage a shaft to provide translational movement of the shaft relative to the housing. The drive system is supported within the housing using a drive support such that cooperation of a spur gear of the drive system with the shaft is substantially unaffected by compression loads generated during operation of the present invention. The drive support also provides for angular adjustment of the spur gear relative to the shaft to ensure proper engagement of teeth of the spur gear with teeth formed on the shaft. Additionally, the drive support provides for positional manipulation of the spur gear toward or away from the shaft to ensure proper engagement of the teeth of the spur gear with the teeth formed on the shaft.

Another technical advantage of the present invention includes greater flexibility than prior systems by providing for angular and rotational adjustment of the ladder relative to the vacuum chamber. For example, according to one aspect of the present invention, an angular adjustment system may be used to modify an angular orientation of the ladder relative to the vacuum chamber. Additionally, according to another aspect of the present invention, a rotational adjustment system may be used to modify a rotational orientation of the ladder relative to the vacuum chamber.

Other technical advantages of the present invention will be readily apparent to one skilled in the art from the following figures, descriptions, and claims.

BRIEF DESCRIPTION OF THE DRAWINGS

For a more complete understanding of the present invention, and the advantages thereof, reference is now made to the following descriptions taken in connection with the accompanying drawings, in which.

DETAILED DESCRIPTION OF THE INVENTION

Embodiments of the present invention and the advantages thereof are best understood by referring to the following description and drawings, wherein like numerals are used for like and corresponding parts of the various drawings.

Figure 1A:
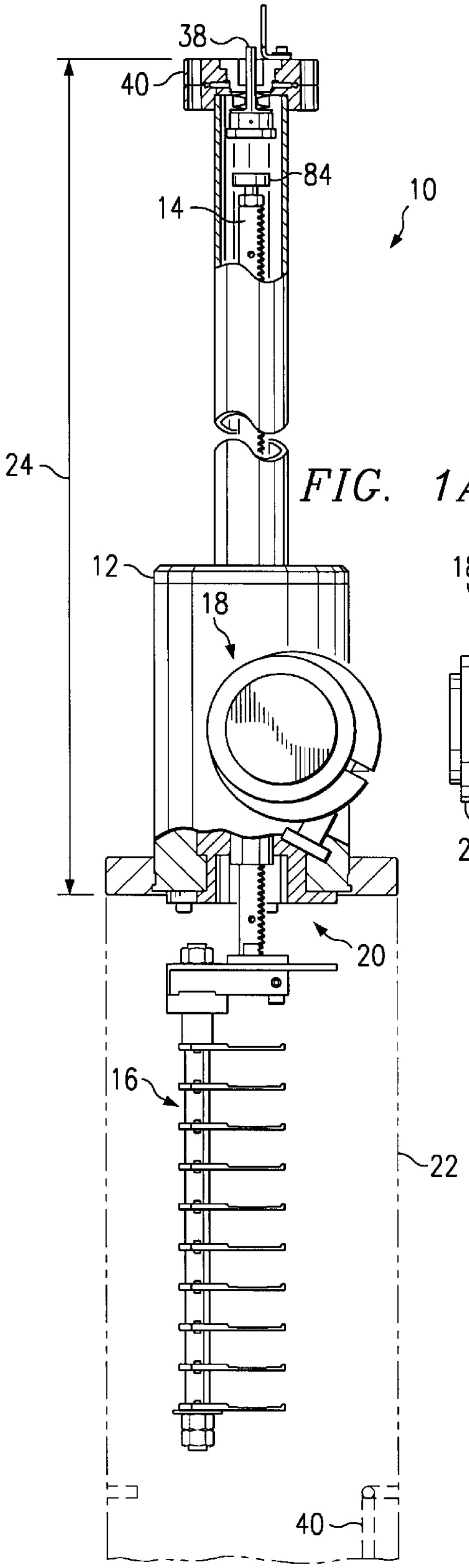
FIGS. 1A and 1B are diagrams illustrating a system for manufacturing a photocathode in accordance with an embodiment of the present invention.
Figure 1B:
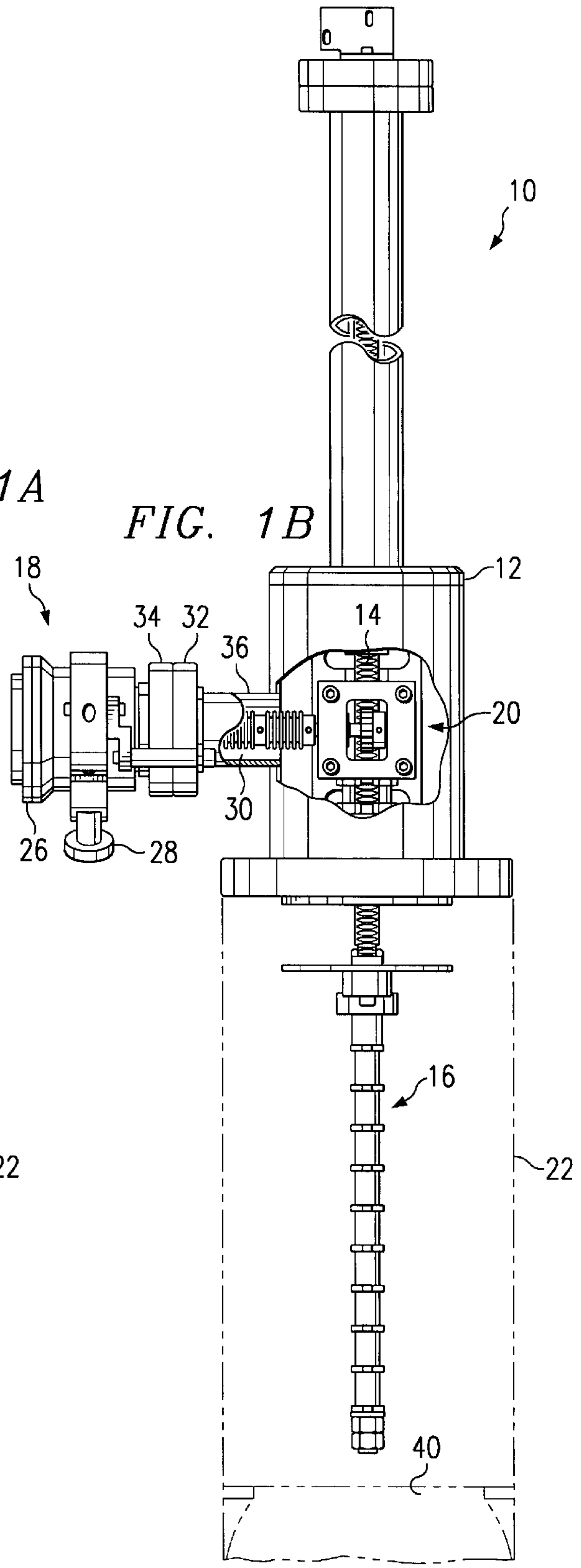

FIG. 1A is a diagram illustrating a system 10 for manufacturing a photocathode (not explicitly shown) in accordance with an embodiment of the present invention, and FIG. 1B is a diagram illustrating a side view of system 10 illustrated in FIG. 1A. System 10 comprises a housing 12, a shaft 14 disposed within housing 12, a ladder 16 coupled to shaft 14, a drive system 18, and a drive support 20. Briefly, housing 12 is coupled to a vacuum chamber 22. Vacuum chamber 22 may be configured for performing various material processing operations on the photocathodes under vacuum pressures. The photocathodes are positioned at various locations of ladder 16 and drive system 18 is activated to translate ladder 16 upwardly or downwardly relative to housing 12 to position the photocathodes at predetermined locations within vacuum chamber 22.

Housing 12 is configured to be attached to vacuum chamber 22 and may be constructed from steel or other suitable materials to maintain vacuum pressures. For example, housing 12 may be constructed by welding a plurality of generally tubular members together; however, other suitable materials and methods may be used for constructing housing 12. Housing 12 is also constructed having a vertical length, indicated generally at 24, to accommodate required translation of shaft 14 to position the photocathodes disposed on ladder 16 at the predetermined locations within vacuum chamber 22.

Drive support 20 is disposed within housing 12 and supports drive system 18 extending into housing 12. In the embodiment illustrated in FIGS. 1A and 1B, drive system 18 comprises a rotary drive mechanism 26, a drag brake 28, and a flexible coupling 30. Briefly, activation of rotary drive mechanism 26 causes translation of shaft 14 relative to housing 12. Shaft 14 is coupled to ladder 16 such that translation of shaft 14 relative to housing 12 causes translation of ladder 16 relative to vacuum chamber 22.

Rotary drive mechanism 26 may include a magnetically-coupled rotary drive mechanism or other suitable device or method to provide translation of shaft 14 relative to housing 12. Drag brake 28 may be used to regulate a velocity of shaft 14 relative to housing 12. As illustrated in FIG. 1B, housing 12 comprises a flange 32 configured to be coupled to a corresponding flange 34 of rotary drive mechanism 26. Flexible coupling 30 is coupled to rotary drive mechanism 26 and extends through a passage 36 of housing 12 toward drive support 20. In operation, flexible coupling 30 accommodates angular misalignment between rotary drive mechanism 26 and shaft 14.

System 10 may also comprise a sensor 38 disposed at an end 40 of housing 12 to determine a position of shaft 14 relative to housing 12. For example, vacuum chamber 22 may include a gate valve 40 for sealing a portion of vacuum chamber 22 relative to system 10. In operation, valve 40 may be secured in a closed position, thereby sealing a portion of vacuum chamber 22 relative to system 10 while housing 12 is evacuated. Once the vacuum pressure in housing 12 is substantially equal to a vacuum pressure within the sealed portion of vacuum chamber 22, valve 40 may be opened. Rotary drive mechanism 26 may then be actuated to translate ladder 16 downwardly relative to vacuum chamber 22 to position the photocathodes disposed on ladder 16 at predetermined locations within vacuum chamber 22. After removal of the photocathodes from ladder 16, rotary drive mechanism 26 may be actuated to translate ladder 16 upwardly relative to vacuum chamber 22.

Sensor 38 may be used to determine a position of shaft 14 within housing 12 to prevent damage to ladder 16. For example, damage to ladder 16 may result from premature closing of valve 40 prior to complete withdrawal of ladder 16 relative to valve 40. Thus, sensor 38 may be used to determine a position of shaft 14, and correspondingly a position of ladder 16 relative to valve 40, to verify withdrawal of ladder 16 relative to valve 40 prior to closing valve 40.

For example, sensor 38 may comprise a limit switch, proximity sensor, or other suitable sensing or detecting device to determine a position of shaft 14 relative to housing 12. Once a position of shaft 14 corresponding to a complete withdrawal of ladder 16 relative to valve 40, sensor 38 may transmit a signal operable to activate closing of valve 40. For example, the signal generated by sensor 38 may be used to notify an operator of system 10 that valve 40 may be closed, or the signal generated by sensor 38 may be used to automatically close valve 40. Additionally, system 10 may be configured such that valve 40 may not be closed prior to receiving a signal generated by sensor 38. Thus, system 10 provides greater reliability than prior systems by determining a position of ladder 16 relative to vacuum chamber 22 prior to activating valve 40 to seal vacuum chamber 22 relative to system 10.

Figure 2A:
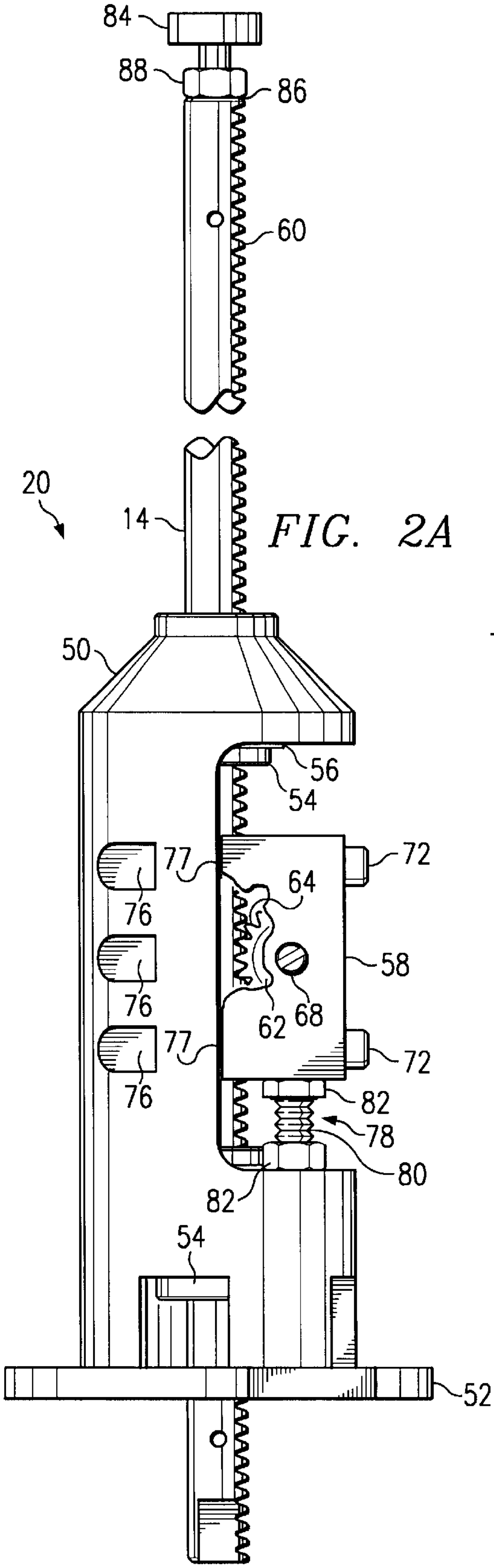
FIGS. 2A and 2B are diagrams illustrating a drive support of the system illustrated in FIGS. 1A and 1B in accordance with an embodiment of the present invention.
Figure 2B:
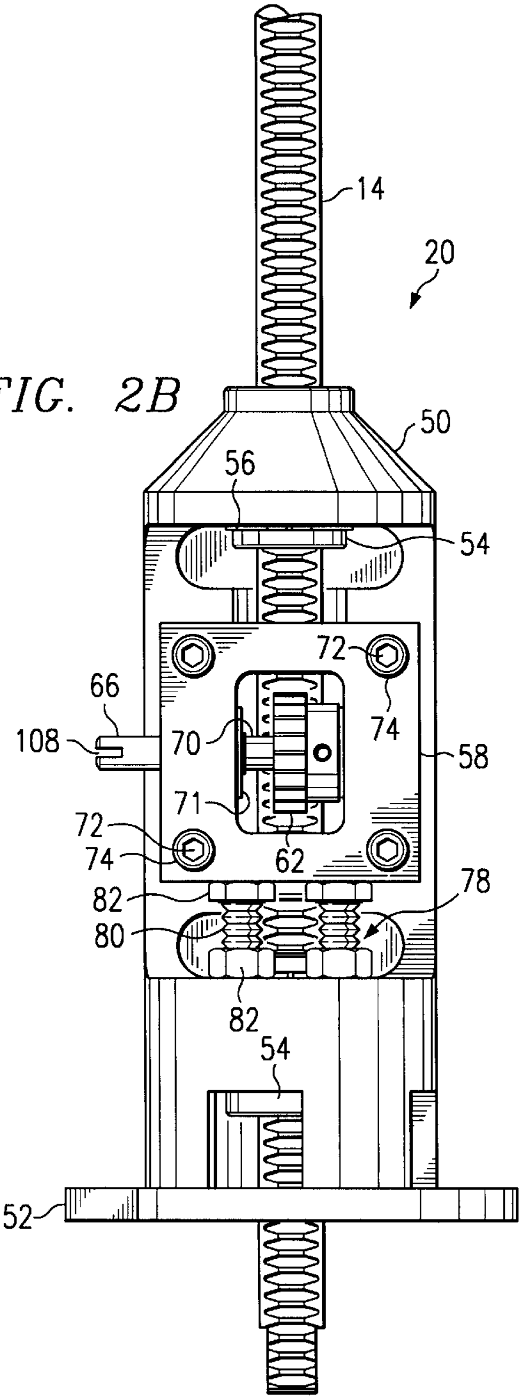

FIG. 2A is a diagram illustrating drive support 20 in accordance with an embodiment of the present invention, and FIG. 2B is a diagram illustrating a side view of drive support 20 illustrated in FIG. 2A. Drive support 20 comprises a bearing housing 50 having a mounting flange 52 for securing bearing housing 50 in housing 12. A plurality of linear bushings 54 are disposed within bearing housing 50 to support translational movement of shaft 14 relative to bearing housing 50. A retaining ring 56 may be used to secure each linear bushing 52 within bearing housing 50. However, other suitable devices or methods may be used to secure linear bushings 54 to bearing housing 50. In operation, shaft 14 extends through linear bushings 54 and bearing housing 50 and translates relative to bearing housing 50 to provide translational movement of ladder 16 relative to vacuum chamber 22.

Drive support 20 also comprises a mounting support 58 for supporting a portion of drive system 18 in engagement with shaft 14. For example, as illustrated in FIGS. 2A and 2B, shaft 14 comprises linearly formed teeth 60. Drive system 18 comprises a spur gear 62 having teeth 64 for engaging corresponding teeth 60 of shaft 14. Spur gear 62 is coupled to an axle 66 such that rotation of axle 66 causes corresponding rotation of spur gear 62, thereby causing translation of shaft 14 relative to bearing housing 50. Axle 66 extends through openings 68 disposed on each side of mounting support 58 and a plurality of bearings 70 coupled to each side of mounting support 58 to support rotational movement of axle 68. Bearings 70 may be secured to mounting support 58 using retaining rings 71.

Mounting support 58 is coupled to bearing housing 50 using fasteners 72 extending through openings 74 of mounting support 58 and into internally threaded openings 76 of bearing housing 50 to provide proper and adjustable engagement of drive system 18 with shaft 14. For example, fasteners 72 may be used to adjust a position of mounting support 58 relative to bearing housing 50 to provide proper engagement of teeth 64 of spur gear 62 with teeth 60 of shaft 14. Once proper engagement of gear 62 and shaft 14 has been obtained, shims, spacers, or other suitable materials may be placed between mounting support 58 and bearing housing 50, indicated generally at 77, and fasteners 72 may be used to secure mounting support 58 in the desired position. Thus, the present invention provides greater reliability and integrity than prior systems by providing adjustable engagement of drive system 18 with shaft 14.

Drive support 20 also comprises a plurality of vertical supports 78 to provide angular adjustment of spur gear 62 relative to shaft 14 and to support compression loads resulting from downwardly directed forces of shaft 14 relative to bearing housing 50. For example, in the embodiment illustrated in FIGS. 2A and 2B, vertical supports 78 comprise threaded elements 80 and a plurality of nuts 82 coupled to each threaded element 80. Threaded elements 80 and nuts 82 may be adjusted to provide angular displacement of mounting support 58 relative to bearing housing 50, thereby providing an angular adjustment of spur gear 62 relative to shaft 14 to obtain proper engagement of teeth 64 of gear 62 with teeth 60 of shaft 14. Vertical supports 78 also provide load transfer and distribution from mounting support 58 to bearing housing 50. For example, compression loads experienced by mounting support 58 may be transferred through vertical supports 78 to bearing housing 50. For example, downwardly directed forces are applied to spur gear 62 from engagement of spur gear 62 with shaft 14. The vertical loads experienced by spur gear 62 are transferred to mounting support 58 and bearing housing 50 through vertical supports 78.

Therefore, the present invention provides greater reliability than prior systems by providing increased accuracy of engagement between spur gear 62 and shaft 14. For example, the angular orientation of mounting support 58 relative to shaft 14 may be adjusted to provide proper engagement of teeth 64 of spur gear 62 with corresponding teeth 60 of shaft 14. Additionally, the present invention provides greater reliability than prior systems by distributing loads generated during operation of system 10 away from delicate components of system 10.

As illustrated in FIGS. 1A and 2A, an adjustable stop 84 may be coupled to an end 86 of shaft 14 to cooperate with sensor 38 to detect a position of shaft 14 relative to housing 12. For example, adjustable stop 84 may comprise externally formed threads (not explicitly shown) for engagement with an internally threaded opening (not explicitly shown) formed in end 86 of shaft 14. Thus, adjustable stop 84 may be threaded into or out of end 86 of shaft 14 to adjust the position of adjustable stop 84 relative to shaft 14 for cooperation with sensor 38. A nut 88 may be used to secure adjustable stop 84 in a desired position relative to shaft 14.

Figure 3A:
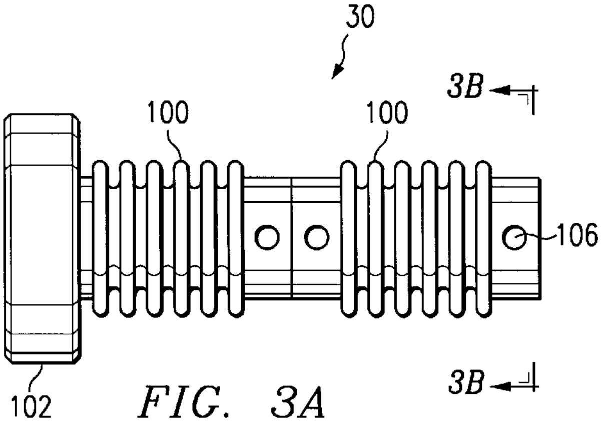
FIGS. 3A and 3B are diagrams illustrating a flexible coupling of the system illustrated in FIGS. 1A and 1B in accordance with an embodiment of the present invention.
Figure 3B:
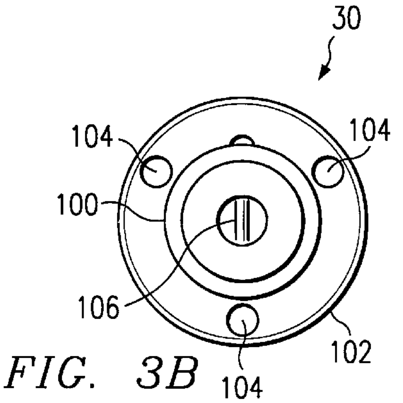

FIG. 3A is a diagram illustrating flexible coupling 30 in accordance with an embodiment of the present invention, and FIG. 3B is a diagram illustrating a side view of flexible coupling 30 illustrated in FIG. 3A. Flexible coupling 30 comprises a plurality of bellows couplings 100 secured together to provide engagement between rotary drive mechanism 26 and spur gear 62. In the embodiment illustrated in FIG. 3A, two bellows couplings 100 are used; however, a greater or fewer quantity of bellows couplings 100 may be used to provide engagement between rotary drive mechanism 26 and spur gear 62.

Flexible coupling 30 also comprises a mounting flange 102 secured at one end of flexible coupling 30 to provide engagement of flexible coupling 30 with rotary drive mechanism 26. For example, mounting flange 102 may comprise openings 104 for receiving fasteners (not explicitly shown) extending through openings 104 and into openings of a corresponding mating flange (not explicitly shown) of rotary drive mechanism 26. Flexible coupling 30 may also comprise a laterally disposed pin 106 disposed at an end of flexible coupling 30 opposite mounting flange 102 for engagement of flexible coupling 30 with spur gear 62. For example, referring to FIG. 2B, axle 66 may be configured having a clevis 108 for engagement with pin 106 such that rotation of flexible coupling 30 relative to bearing housing 50 causes rotation of axle 66 and spur gear 62. However, other suitable methods or devices may be used for engaging spur gear 62 with flexible coupling 30.

In operation, flexible coupling 30 accommodates angular misalignment between components of housing 12 to prevent misalignment and improper engagement of spur gear 62 relative to shaft 14. For example, housing 12 may be constructed from various tubular sections welded together to provide vacuum integrity for housing 12. However, welding processes may cause angular deflections between welded tubular sections relative to each other. For example, referring to FIG. 1B, drive system 18 extends through passage 36 of housing 12 to engage shaft 14. However, angular deflection or misalignment of passage 36 relative to shaft 14 may cause misalignment of spur gear 62 relative to shaft 14. Accordingly, flexible coupling 30 accommodates angular misalignment between drive system 18 and shaft 14 such that the angular misalignment is substantially prevented from influencing engagement of spur gear 62 and shaft 14.

Figure 4A:
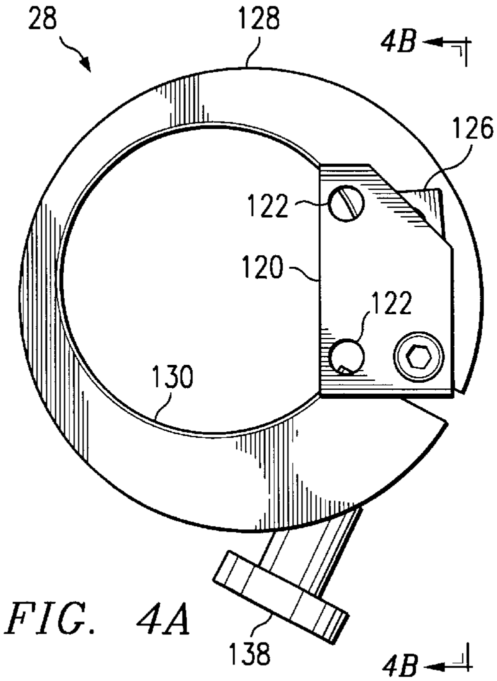
FIGS. 4A and 4B are diagrams illustrating a drag brake of the system illustrated in FIGS. 1A and 1B in accordance with an embodiment of the present invention.
Figure 4B:
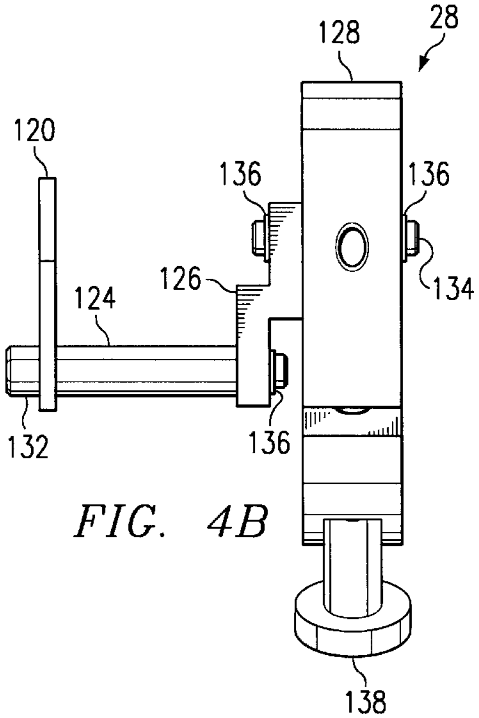

FIG. 4A is a diagram illustrating drag break 28 in accordance with an embodiment of the present invention, and FIG. 4B is a diagram illustrating a side view of drag break 28 illustrated in FIG. 4A. Drag break 28 comprises a mounting plate 120 for securing drag break 28 relative to drive system 18. For example, mounting plate 120 may comprise openings 122 for receiving fasteners (not explicitly shown) extending through openings 122 and into flange 32 of housing 12, as best illustrated in FIG. 1B. However, other suitable methods or devices may be used to secure drag break 28 relative to drive system 18.

Referring to FIGS. $A and 4B, drag break 28 also comprises a connecting rod 124, a connecting link 126, and a compression ring 128. Connecting rod 124 and connecting link 126 may be used to position compression ring 128 at a predetermined location relative to rotary drive mechanism 26 such that a compression surface 130 of compression ring 128 engages a portion of rotary drive mechanism 26 to control a rotational velocity of rotary drive mechanism 26. However, other suitable methods or devices may be used to position compression surface 130 of compression ring 128 at a predetermined location relative to rotary drive mechanism 26.

As illustrated in FIG. 4A, a fastener 132 may be extended through connecting rod 124 to couple mounting plate 120 to connecting link 126. Additionally, a pin 134 may be used to couple connecting link 126 to compression ring 128. Retaining rings 136 may be used to secure fastener 132 and pin 134. Thus, in operation, a control knob 138 coupled to compression ring 128 may be used to control a rotational velocity of rotary drive mechanism 26, thereby controlling a translational velocity of shaft 14 and ladder 16 relative to housing 12 and vacuum chamber 22. For example, control knob 138 may be used to increase or decrease frictional forces between compression surface 130 of compression ring 128 and rotary drive mechanism 26 to control the rotational velocity of rotary drive mechanism 26.

Figure 5A:
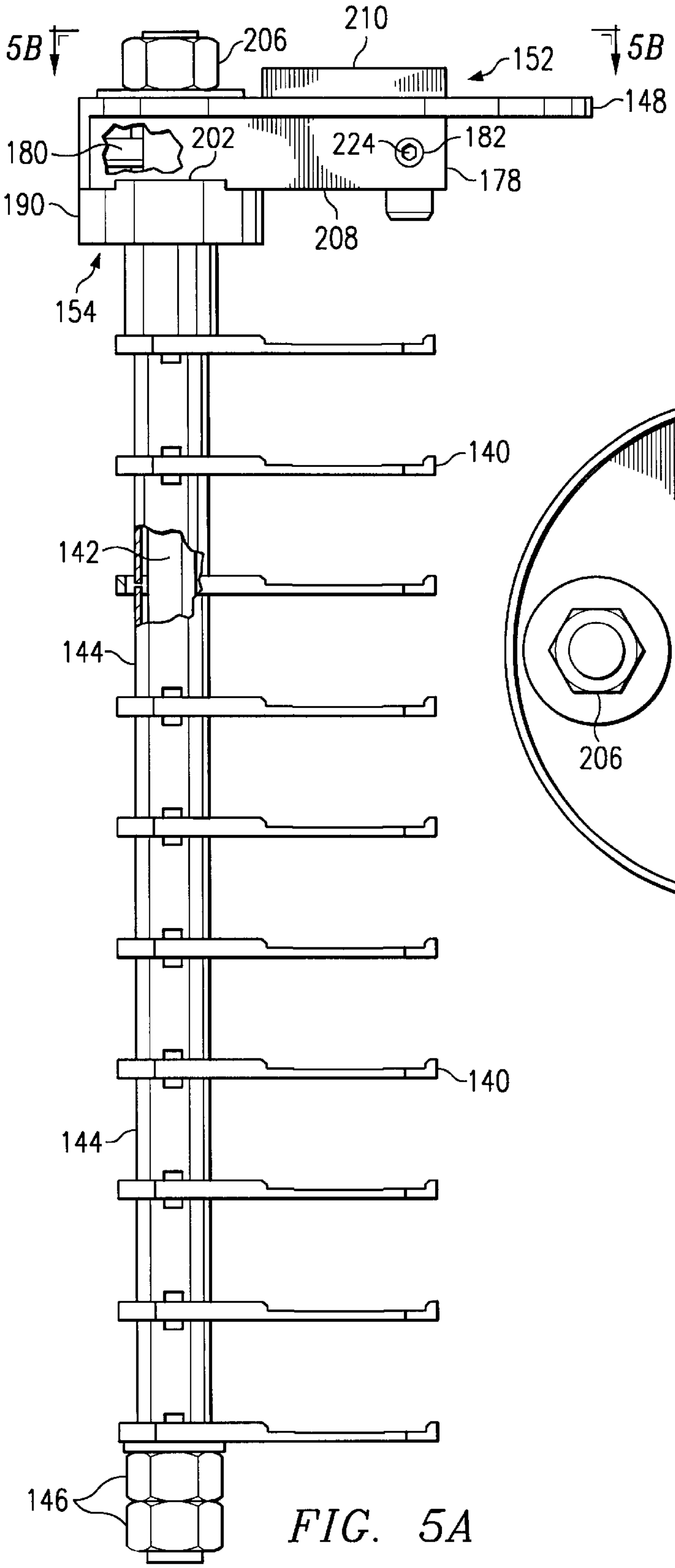
FIGS. 5A and 5B are diagrams illustrating a ladder of the system illustrated in FIGS. 1A and 1B in accordance with an embodiment of the present invention.
Figure 5B:
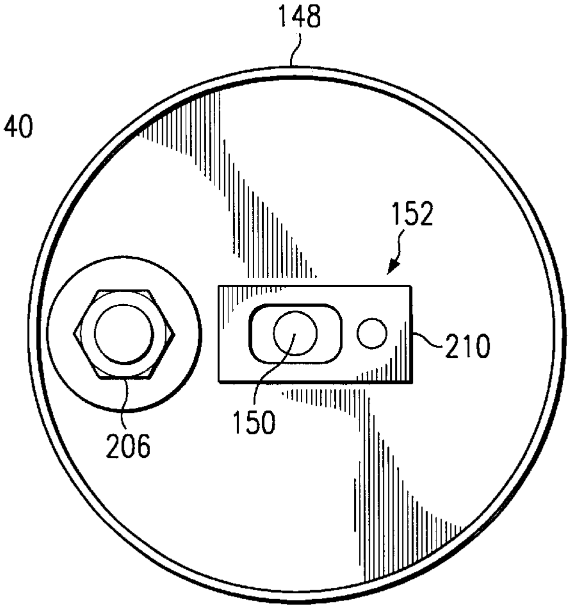

FIG. 5A is a diagram illustrating ladder 16 in accordance with an embodiment of the present invention, and FIG. 5B is a diagram illustrating a top view of ladder 16 illustrated in FIG. 5A. Ladder 16 comprises vertically spaced apart rungs 140 coupled to a rod 142. Rungs 140 are configured to retain the photocathodes as ladder 16 is translated upwardly and downwardly relative to vacuum housing 22 to position the photocathodes at predetermined locations within vacuum chamber 22. Spacers 144 may be positioned between each rung 140 to position rungs 140 at predetermined distances from each other. Rungs 140 and spacers 144 may be secured to rod 142 using a plurality of nuts 146; however, other suitable methods or devices may be used for securing rungs 140 and spacers 144 to rod 142. For example, nuts 146 may be tightened against each other to secure rungs 140 and spacers 144 to rod 142 and prevent disengagement of nuts 146 from rod 142.

Ladder 16 also comprises a hanger plate 148 for coupling ladder 16 to shaft 14. Briefly, shaft 14 is coupled to hanger plate 48 by extending a fastener (not explicitly shown) through an opening 150 in hanger plate 148 to engage shaft 14. System 10 also comprises a rotational adjustment system 152 to provide rotational adjustment of ladder 16 relative to vacuum chamber 22. Additionally, system 10 comprises an angular adjustment system 154 to provide angular adjustment of ladder 16 relative to vacuum chamber 22.

Figure 6A:
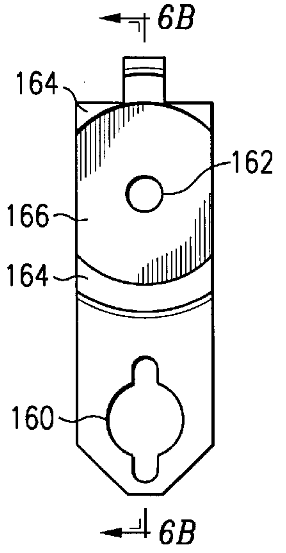
FIGS. 6A and 6B are diagrams illustrating a rung for the ladder in FIGS. 5A and 5B in accordance with an embodiment of the present invention.
Figure 6B:
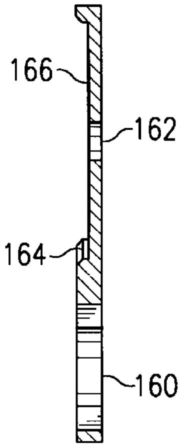

FIG. 6A is a diagram illustrating rung 40 in accordance with an embodiment of the present invention, and FIG. 6B is a section diagram of rung 140 illustrated in FIG. 6A taken along the line 6B—6B of FIG. 6A. Rung 140 comprises an opening 160 for receiving rod 142 of ladder 16. Rung 140 may also comprise an opening 162 to provide alignment of rungs 140 along rod 142. For example, once rungs 140 and spacers 144 are positioned along rod 142, a rod or shaft (not explicitly shown) may be extended through opening 162 of each rung 140 to align the respective rungs 140 along rod 142. However, other suitable methods or devices may be used for aligning rungs 140.

Rung 140 also comprises a seating area 164 for receiving and retaining a photocathode. In the embodiment illustrated in FIG. 6A, seating area 164 comprises a circular configuration corresponding to a photocathode having a circular configuration; however, other suitable configurations may be used for receiving and retaining a photocathode. Rung 140 may also comprise a recessed area 166 disposed adjacent seating area 164 to prevent contact of portions of the photocathode with rung 140. For example, a photocathode may include a generally planar surface disposed within seating area 164 such that a portion of the planar surface of the photocathode contacts seating area 164 while an adjacent portion of the photocathode is free from contact with rung 140 and extends across and above recessed area 166, thereby preventing contact of a portion of the photocathode with rung 140.

Figure 7A:
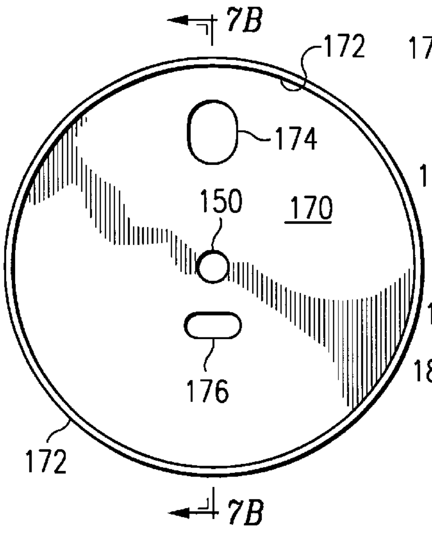
FIGS. 7A, 7B and 7C are diagrams illustrating a hanger plate for the ladder in FIGS. 5A and 5B in accordance with an embodiment of the present invention.
Figure 7B:
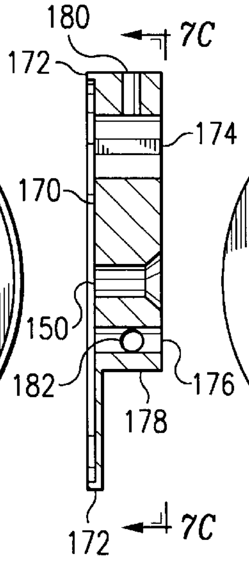
Figure 7C:
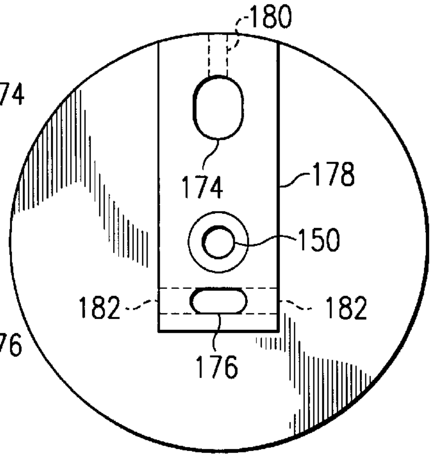

FIGS. 7A, 7B, and 7C are diagrams illustrating hanger plate 148 in accordance with an embodiment of the present invention. As described above, hanger plate 148 comprises opening 150 for coupling hanger plate 148 to shaft 14. For example, shaft 14 may be disposed against a surface 170 of hanger plate 148 and a fastener (not explicitly shown) may be inserted through opening 150 to engage an internally threaded opening (not explicitly shown) at an end of shaft 14 disposed against surface 170. However, other suitable devices or methods may be used to couple hanger plate 148 to shaft 14.

Hanger plate 148 also comprises a wall 172 extending above and circumferentially about surface 170. In operation, hanger plate 148 shields the photocathodes disposed on rungs 140 during movement of ladder 16 within vacuum chamber 22. For example, hanger plate 148 substantially prevents any debris or foreign material travelling downwardly from above hanger plate 148 from contact with the photocathodes disposed on rungs 140. Additionally, wall 172 substantially retains any debris or foreign material received on surface 170 from travelling downwardly onto the photocathodes. Thus, the present invention provides greater photocathode integrity by substantially preventing any foreign debris or material from contact with the photocathodes during movement of the photocathodes within vacuum chamber 22.

Hanger plate 148 also comprises an opening 174 and an opening 176. Openings 174 and 176 extend through an extended portion 178 of hanger plate 148 and cooperate with angular adjustment system 154 and rotational adjustment system 152, respectively, to provide adjustment of ladder 16 relative to vacuum chamber 22.

Hanger plate 148 also comprises a plurality of transversely disposed openings 180 and 182 relative to openings 174 and 176, respectively. In this embodiment, openings 180 and 182 are constructed having internally formed threads such that a fastener (not explicitly shown) may be inserted into openings 180 and 182 to engage corresponding internally formed threads of openings 180 and 182 to secure ladder 16 in a desired angular and rotational orientation after adjustment using rotational adjustment system 152 and angular adjustment system 154. The rotational and angular adjustment of ladder 16 is described in greater detail below.

Figure 8A:
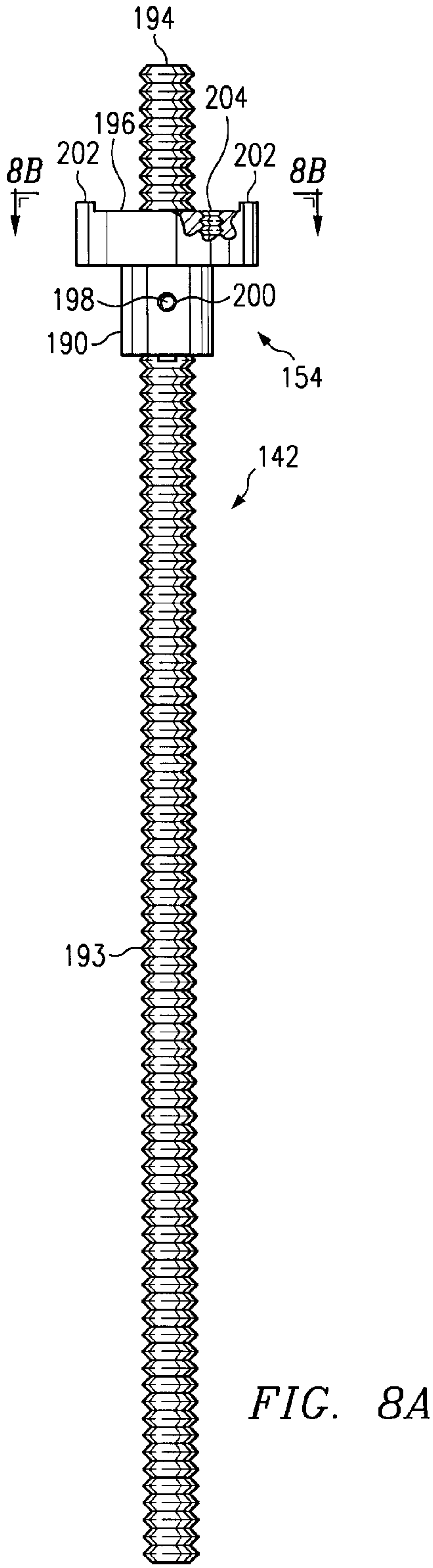
FIGS. 8A and 8B are diagrams illustrating a rod and angular adjustment system for the ladder in FIGS. 5A and 5B in accordance with an embodiment of the present invention.
Figure 8B:
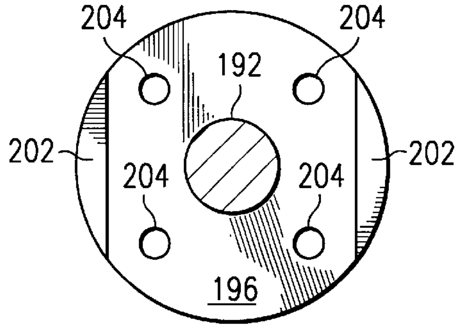

FIG. 8A is a diagram illustrating rod 142 and angular adjustment system 154 in accordance with an embodiment of the present invention, and FIG. 8B is a diagram illustrating a side view of angular adjustment system 154 illustrated in FIG. 8A. Angular adjustment system 154 comprises an adjustment support 190 coupled to rod 142. For example, adjustment support 190 may be constructed having an internally threaded opening 192 for engaging externally formed threads 193 of rod 142. However, other suitable methods or devices may be used for adjustably securing adjustment support 190 to rod 142.

In operation, rod 142 may be rotated relative to adjustment support 190 to dispose an end 194 of rod 142 a predetermined distance from a surface 196 of adjustment support 190. Once end 194 of rod 142 is positioned a desired distance from surface 196 of adjustment support 190, a spring pin 198 may be inserted into an opening 200 of adjustment support 190 to secure adjustment support 190 relative to rod 142. However, other suitable methods or devices may be used to secure adjustment support 190 relative to rod 142. Adjustment support 190 also comprises extended portions 202 disposed on each side of surface 196 and extending outwardly toward end 194 of rod 142. Adjustment support 190 also comprises internally threaded openings 204 extending through surface 196.

Figure 9:
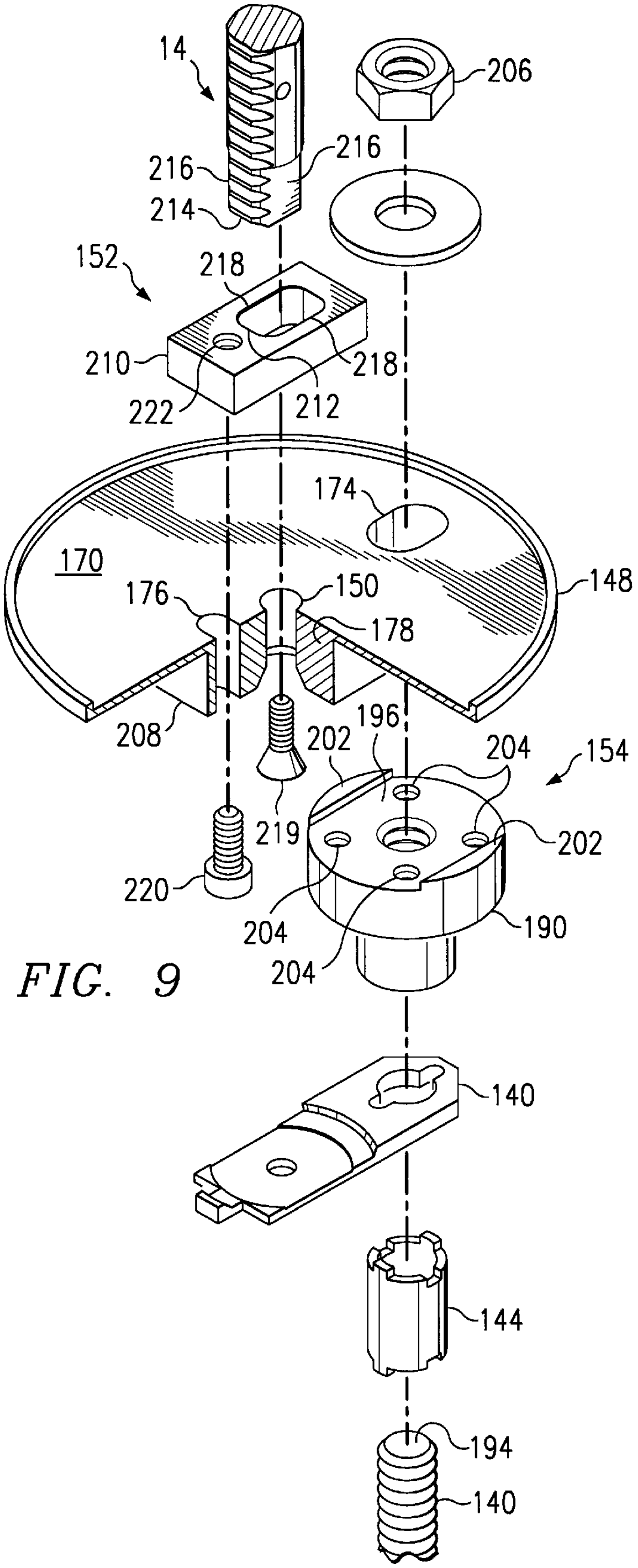
FIG. 9 is a diagram illustrating the coupling of a shaft and the ladder of FIGS. 5A and 5B to the hanger plate of FIGS. 7A, 7B, and 7C, and the operation of angular adjustment system and rotational adjustment system according to an embodiment of the present invention.

FIG. 9 is a diagram illustrating the coupling of shaft 14 and ladder 16 to hanger plate 148 and the operation of angular adjustment system 154 and rotational adjustment system 152. In operation, end 194 of rod 142 is inserted through opening 174 of hanger plate 148 until end 194 of rod 142 extends above surface 170 to accommodate securing rod 142 to hanger plate 148 using a nut 206. Additionally, end 194 of rod 142 is inserted through opening 174 such that surface 196 of adjustment support 190 is positioned adjacent a surface 208 of portion 178 of hanger plate 148. As best illustrated in FIG. 5A, extended portions 202 of adjustment support 190 are disposed on each side of portion 178 of hanger plate 148.

Referring to FIG. 9, fasteners (not explicitly shown) may be extended through internally threaded openings 204 of adjustment support 190 to engage surface 208 of hanger plate 148. Each fastener extending through openings 204 may be adjusted to modify an angular orientation of rod 142 relative to hanger plate 148, thereby providing angular orientation adjustment of ladder 16 relative to vacuum chamber 22.

As illustrated in FIG. 9, opening 174 is constructed having an elongated or slotted configuration to provide lateral manipulation of rod 142 relative to hanger plate 148. Referring to FIG. 5A, once the lateral position and angular orientation of rod 142 has been adjusted to a desired angular orientation, a fastener (not explicitly shown) may be inserted through internally threaded opening 180 of hanger plate 148 to secure rod 142 in the desired angular orientation. Additionally, nut 206 may be tightened to secure rod 142 in the desired angular orientation.

Referring to FIG. 9, rotational adjustment system 152 comprises an adjustment plate 210 disposed on surface 170 of hanger plate 148. Adjustment plate 210 comprises an opening 212 having a generally rectangular configuration for receiving shaft 14. For example, an end 214 of shaft 14 may be configured having oppositely disposed flats 216. End 214 of shaft 14 is inserted through opening 212 of adjustment plate 210 such that end 214 of shaft 14 is positioned against surface 170 of hanger plate 148. Additionally, flats 216 of shaft 14 engage oppositely disposed surfaces 218 of opening 212 in adjustment plate 210. As described above, a fastener 219 may be inserted through opening 150 of hanger plate 148 to engage in internally threaded opening (not explicitly shown) disposed in end 214 of shaft 14 to secure shaft 14 to hanger plate 148. A fastener 220 may be inserted through opening 176 of hanger plate 148 to engage a corresponding internally threaded opening 222 in adjustment plate 210 to secure adjustment plate 210 to hanger plate 148.

As illustrated in FIG. 9, opening 176 is constructed having a generally elongated or slotted configuration to provide rotational adjustment of hanger plate 148 relative to shaft 14. For example, the rotational orientation of hanger plate 148 relative to shaft may be adjusted by rotating hanger plate 148 relative to shaft 14 by adjusting the position of fastener 220 within opening 176. Once hanger plate 148 is positioned in a desired rotational orientation relative to shaft 14, fastener 220 may be tightened to secure adjustment plate 210 in the desired position. Additionally, fastener 219 may be tightened relative to shaft 14 to secure shaft 14 in the desired rotational orientation relative to hanger plate 148. Additionally, referring to FIG. 5A, a plurality of fasteners 224 may be inserted into internally threaded openings 182 of hanger plate 148 to secure the rotational orientation of hanger plate 148 relative to shaft 14.

Thus, the present invention provides greater flexibility than prior systems by providing angular and rotational adjustment of ladder 16 relative to vacuum chamber 22. For example, angular adjustment system 154 may be used to modify an angular orientation of ladder 16 relative to vacuum chamber 22. Additionally, rotational adjustment system 152 may be used to modify a rotational orientation of ladder 16 relative to vacuum chamber 22.

Although the present invention and its advantages have been described in detail, it should be understood that various changes, substitutions and alterations can be made without departing from the spirit and scope of the present invention as defined by the appended claims.

What is claimed is:

1. A system, comprising:

a housing having a first end and a second end, the first end coupled to a vacuum chamber;

a drive support disposed within the housing;

a shaft disposed within the housing the shaft adapted to extend into the vacuum chamber;

a ladder coupled to the shaft, the ladder comprising at least one rung operable to retain a photocathode;

a drive system supported by the drive support within the housing, the drive system coupled to the shaft and operable to translate the shaft relative to the housing to position the rung of the ladder at a predetermined location within the vacuum chamber;

wherein the drive support comprises:

a bearing housing;

a plurality of linear bushings coupled to the bearing housing and operable to support translation of the shaft relative to the housing;

a gear operable to engage corresponding teeth formed on the shaft;

a rotary drive mechanism operable to provide rotation of the gear relative to the shaft; and wherein the drive support further comprises a mounting support coupled to the bearing housing, the mounting support operable to adjust an angular position of the gear relative to the shaft.

2. The system of claim 1, further comprising a sensor coupled to the housing and operable to generate a signal in response to a position of the shaft within the housing.

3. The system of claim 2, wherein the sensor is disposed on the second end of the housing, and wherein the sensor transmits the signal to provide activation of a gate valve of the vacuum chamber.

4. The system of claim 1, wherein the ladder further comprises a cover disposed adjacent the rung and operable to shield the photocathode during movement of the photocathode into the vacuum chamber.

5. The system of claim 1, wherein the housing is operable to maintain a vacuum pressure.

6. The system of claim 1, wherein the drive system comprises:

a rotary drive mechanism coupled to the shaft; and a brake coupled to the rotary drive mechanism, the brake operable to control a velocity of the shaft relative to the housing.

7. The system of claim 1, wherein the drive support further comprises:

a mounting support coupled to the bearing housing; and a plurality of vertically adjustable supports coupled between the mounting support and the bearing housing.

8. A system, comprising:

a housing having a first end and a second end, the first end coupled to a vacuum chamber;

a drive support disposed within the housing;

a shaft disposed within the housing, the shaft adapted to extend into the vacuum chamber;

a ladder coupled to the shaft, the ladder comprising at least one rung operable to retain a photocathode;

a drive system supported by the drive support within the housing, the drive system coupled to the shaft and operable to translate the shaft relative to the housing to position the rung of the ladder at a predetermined location within the vacuum chamber; and further comprising an angle adjustment system coupled to the ladder and operable to adjust an angle of the ladder relative to the vacuum chamber.

9. A method for manufacturing a loading system, comprising:

providing a housing;

coupling a vacuum chamber to the housing;

disposing a shaft within the housing;

coupling the shaft to a ladder, the ladder having at least one rung operable to retain a photocathode;

coupling the shaft to a drive system, the drive system operable to translate the shaft relative to the housing to position the rung at a predetermined location within the vacuum chamber;

supporting the drive system within the housing using a drive support; and coupling an angle adjustment system to the ladder, the angle adjustment system operable to modify an angle of the ladder relative to the vacuum chamber.

10. A method for manufacturing a loading system, comprising:

providing a housing;

coupling a vacuum chamber to the housing;

disposing a shaft within the housing;

coupling the shaft to a ladder, the ladder having at least one rung operable to retain a photocathode;

coupling the shaft to a drive system, the drive system operable to translate the shaft relative to the housing to position the rung at a predetermined location within the vacuum chamber;

supporting the drive system within the housing using a drive support;

disposing a gear in a mounting block;

coupling the mounting block to the drive support;

engaging teeth of the gear with corresponding teeth formed on the shaft; and adjusting an angular orientation of the mounting block relative to the shaft.

11. The method of claim 10, further comprising:

disposing a plurality of linear bushings in the drive support, the linear bushings operable to support translational movement of the shaft relative to the housing; and disposing the shaft within the linear bushings.

12. The method of claim 10, further comprising coupling a hanger plate to the ladder, the hanger plate operable to shield the photocathode during movement of the photocathode into the vacuum chamber.

13. The method of claim 10, further comprising regulating a velocity of the shaft relative to the housing using a brake of the drive system.

14. The method of claim 10, further comprising coupling the gear to a rotary drive mechanism, the rotary drive mechanism operable to rotate the gear to translate the shaft relative to the housing.

15. The method of claim 10, further comprising coupling a rotational adjustment system to the ladder, the rotational adjustment system operable to modify a rotational orientation of the ladder relative to the vacuum chamber.

16. A system, comprising:

a housing having a first end and a second end, the first end coupled to a vacuum chamber;

a drive support coupled to, and disposed within, the housing, the drive support including a bearing housing;

a shaft disposed within the housing, the shaft having a first end arid a second end that is adapted to extend into the vacuum chamber;

a ladder coupled to the second end of the shaft, the ladder comprising a rod and a plurality of spaced apart rungs each coupled to the rod in a cantilevered manner, each rung operable to retain a photocathode;

a drive system coupled to the housing, the drive system having a rotary drive mechanism that is coupled to the shaft by an axle and a spur gear;

a mounting support associated with the drive support, the mounting support adapted to support the axle of the rotary drive mechanism, the rotary drive mechanism operable to translate the shaft relative to the housing; and wherein the drive support further comprises a mounting support coupled to the bearing housing, the mounting support operable to a adjust an angular position of the gear relative to the shaft.

* * * * *